(No Model.)
E. R. PETTIT.
HOLDER FOR FLOSS SILK AND TOOTH PICKS AND CUTTING ATTACHMENT.
No. 465,677. Patented Dec. 22, 1891.
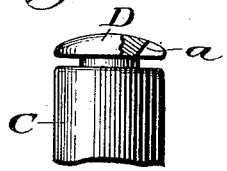
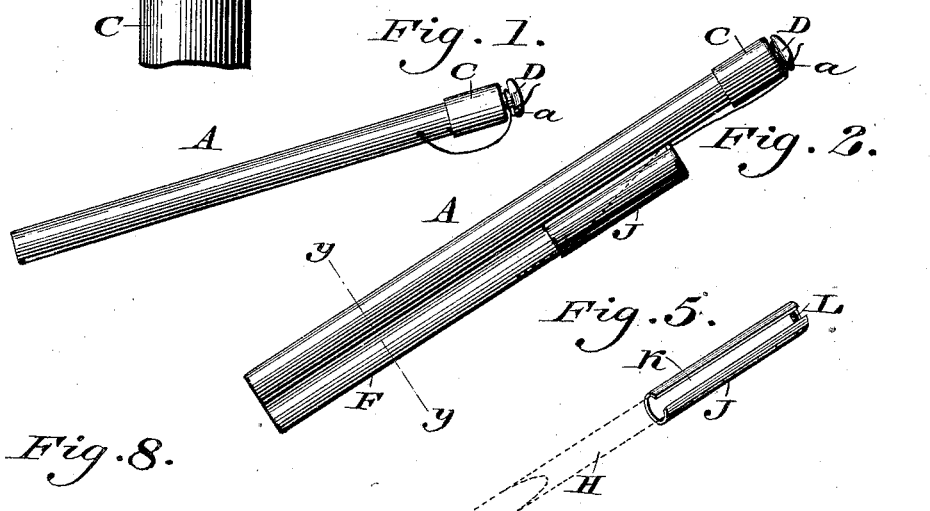
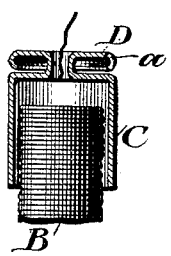
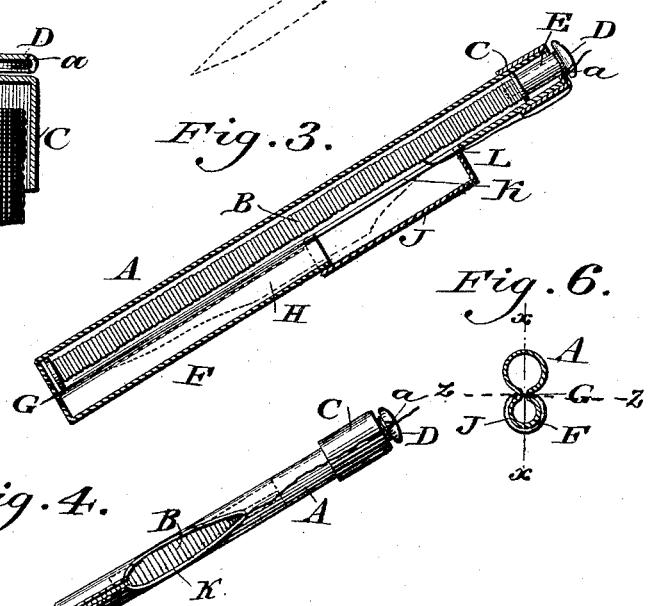
WITNESSES:
P. F. Nagle
L. Douville
INVENTOR:
Elihu R. Pettit
BY John A. Wiedersheim
ATTORNEY.

UNITED STATES PATENT OFFICE.

ELIHU R. PETTIT, OF PHILADELPHIA, PENNSYLVANIA.

HOLDER FOR FLOSS SILK AND TOOTH-PICKS AND CUTTING ATTACHMENTS.

SPECIFICATION forming part of Letters Patent No. 465,677, dated December 22, 1891.

Application filed November 14, 1889. Renewed January 22, 1891. Serial No. 378,651. (No model.)

*To all whom it may concern:*

Be it known that I, ELIHU R. PETTIT, a citizen of the United States, residing in the city and county of Philadelphia, State of Pennsylvania, have invented a new and useful Improvement in Holders for Floss Silk and Tooth-Picks and Cutting Attachments, which improvement is fully set forth in the following specification and accompanying drawings.

My invention relates to an implement comprising a floss-silk cop or bobbin holder provided with a cutting attachment.

The invention further consists of a tooth-pick holder formed with or attached to the floss-silk holder and provided with a removable cap, as will be hereinafter more fully set forth.

Figure 1 represents a side elevation of a floss-silk implement embodying my invention. Fig. 2 represents a side elevation of a combined floss-silk and tooth-pick holder and silk-cutter embodying my invention. Fig. 3 represents a longitudinal section on line $x$ $x$, Fig. 6. Fig. 4 represents a transverse section on line $z$ $z$ of Fig. 6 of a part of the floss-silk-holding tube, showing the tooth-pick-holding tube removed and the connecting-neck thereof in section, also showing the feed-opening for the silk. Fig. 5 represents a detail perspective view of the tooth-pick-holder cap. Fig. 6 represents a section on line $y$ $y$, Fig. 2. Fig. 7 represents the cutting attachment shown applied to a portion of the silk-cylinder. Fig. 8 represents a modification of a part of the device.

Similar letters of reference indicate corresponding parts in the several figures.

Referring to the drawings, A designates the main cylinder for the reception of a spool, cop, or bobbin B of floss silk or analogous material, and has a cap C removably mounted thereon, in which is fitted a button or disk D, formed with a cutting edge or notch $a$, and has a shank E, adapted to pass within or press against the spool, cop, or bobbin B. Said button or disk D may be separately attached, or, as shown by Fig. 8, the same may be struck up integral with the cap C, in the form of an eyelet. A shorter cylinder F is adapted to be formed integrally with or attached to the cylinder A by being struck up or drawn out from the same piece of metal as the latter, the said construction providing an opening G, covered by a neck between said cylinders. A removable cap J is fitted over or within the open end of cylinder F and has a slot K in one side thereof to embrace the neck formed by the opening G between the cylinders and an opening L in the top thereof for the passage of the silk to the exterior of the implement.

It will be understood that the parts may be ornamented in any desired manner and that the spool, cop, or bobbin will be replenished when necessary. The opening G between the cylinders allows the silk to play off the spool, cop, or bobbin at varying elevations, and the opening L in cap J forms a guide for said silk. When a portion or length of the silk is to be used, the same may be drawn out and severed by winding it around the shank of cap D and pressing it into notch $a$, which is so beveled and sharpened as to cut the silk with but slight exertion or force.

Having thus described my invention, what I claim as new, and desire to secure by Letters Patent, is—

1. An implement of the nature set forth, having two non-separable cylinders or tubes for holding a spool, cop, or bobbin of silk or analogous material, and a tooth-pick, one of said cylinders having a movable cap which embraces the neck of the other cylinder, substantially as described.

2. Two non-separable cylinders or tubes for the purpose set forth, having an opening between the same, and a cap for one of said cylinders or tubes, formed with a slot in the side thereof and an opening in the top, substantially as described.

3. An implement of the nature set forth, comprising two integral cylinders or tubes having an opening between the same, a cap for one of said cylinders or tubes having a cutting device therein and a cap for the other cylinder or tube having a side slot and top opening, substantially as described.

ELIHU R. PETTIT.

Witnesses:
JOHN A. WIEDERSHEIM,
CHARLES S. HYER.